US012372501B2

(12) United States Patent
Raymond et al.

(10) Patent No.: US 12,372,501 B2
(45) Date of Patent: Jul. 29, 2025

(54) GRADIENT PROPORTIONING VALVE

(71) Applicant: Waters Technologies Corporation, Milford, MA (US)

(72) Inventors: Timothy M. Raymond, Boston, MA (US); Christopher Walden, Framingham, MA (US); Sean Eric Anderson, Dedham, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/615,474

(22) Filed: Mar. 25, 2024

(65) Prior Publication Data

US 2024/0241087 A1    Jul. 18, 2024

Related U.S. Application Data

(63) Continuation of application No. 17/104,772, filed on Nov. 25, 2020, now Pat. No. 11,940,424.

(Continued)

(51) Int. Cl.
*G01N 30/32* (2006.01)
*B01D 15/16* (2006.01)
(Continued)

(52) U.S. Cl.
CPC ........... *G01N 30/32* (2013.01); *B01D 15/163* (2013.01); *B01D 15/166* (2013.01); *B01F 25/1051* (2022.01); *G01N 30/34* (2013.01)

(58) Field of Classification Search
None
See application file for complete search history.

(56) References Cited

U.S. PATENT DOCUMENTS 2,902,988 A   9/1959   Rippingille
3,327,729 A   6/1967   Erickson
(Continued)

FOREIGN PATENT DOCUMENTS

CN    1393693 A      1/2003
CN    101400418 A    4/2009
(Continued)

OTHER PUBLICATIONS

International Search Report and Written Opinion in PCT/US2020/062258 mailed on Mar. 3, 2021.
(Continued)

*Primary Examiner* — Justin N Olamit
(74) *Attorney, Agent, or Firm* — Schmeiser, Olsen & Watts LLP; Victor J. Baranowski, Esq.

(57) ABSTRACT

Disclosed is a gradient proportioning valve for liquid chromatography that includes a plurality of inlet ports configured to receive a plurality of fluids, a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports, an actuation mechanism having a piston located within a bored structure surrounding the piston, the actuation mechanism configured to open and close at least one of the plurality of conduits in a controlled manner where the piston and the bored structure have a tight tolerance configured to create a fluid tight seal, and a common outlet port configured to receive the fluid composition.

16 Claims, 11 Drawing Sheets

Related U.S. Application Data

(60) Provisional application No. 62/941,236, filed on Nov. 27, 2019.

(51) Int. Cl.
*B01F 25/00* (2022.01)
*G01N 30/34* (2006.01)

(56) References Cited

U.S. PATENT DOCUMENTS

| | | | |
|---|---|---|---|
| 3,398,689 | A | 8/1968 | Allington |
| 3,985,019 | A | 10/1976 | Boehme et al. |
| 4,045,343 | A | 8/1977 | Achener et al. |
| 4,128,476 | A | 12/1978 | Rock |
| 4,347,131 | A | 8/1982 | Brownlee |
| 4,383,551 | A | 5/1983 | Lynch et al. |
| 4,427,298 | A | 1/1984 | Fahy et al. |
| 4,437,812 | A | 3/1984 | Abu-Shumays et al. |
| 4,448,692 | A | 5/1984 | Nakamoto et al. |
| 4,478,713 | A | 10/1984 | Girot et al. |
| 4,496,245 | A * | 1/1985 | Conrad ............ G01N 30/34 366/182.1 |
| 4,522,231 | A | 6/1985 | Bergmann |
| 4,595,496 | A * | 6/1986 | Carson ............ G05D 11/132 210/101 |
| 4,749,976 | A | 6/1988 | Pichler |
| 4,947,893 | A | 8/1990 | Miller et al. |
| 5,105,851 | A * | 4/1992 | Fogelman ............ F16K 11/085 137/625.46 |
| 5,158,441 | A | 10/1992 | Aid et al. |
| 5,253,981 | A | 10/1993 | Yang et al. |
| 5,494,076 | A | 2/1996 | Knapp |
| 5,605,317 | A | 2/1997 | Mealy et al. |
| 5,755,561 | A * | 5/1998 | Couillard ............ F04B 13/02 417/248 |
| 5,862,832 | A * | 1/1999 | Victor ............ G01N 30/34 138/30 |
| 6,116,869 | A | 9/2000 | Couillard et al. |
| 6,242,209 | B1 | 6/2001 | Ransom et al. |
| 2005/0013708 | A1 | 1/2005 | Peeler et al. |
| 2006/0201734 | A1 | 9/2006 | Hartle |
| 2008/0099706 | A1 | 5/2008 | Cook et al. |
| 2008/0210324 | A1 | 9/2008 | Hasunuma |
| 2009/0065724 | A1 | 3/2009 | Mitton et al. |
| 2009/0175738 | A1 | 7/2009 | Shaimi |
| 2010/0012192 | A1 | 1/2010 | Dourdeville et al. |
| 2010/0301069 | A1 | 12/2010 | Bensley |
| 2011/0261642 | A1 | 10/2011 | Shreve et al. |
| 2012/0287746 | A1 | 11/2012 | Angelosanto et al. |
| 2015/0040992 | A1 | 2/2015 | Shreve et al. |
| 2015/0043303 | A1 | 2/2015 | Shreve et al. |
| 2015/0044696 | A1 | 2/2015 | Dothie et al. |
| 2017/0167476 | A1 | 6/2017 | Bozic |
| 2022/0326197 | A1* | 10/2022 | Otsubo ............ G01N 30/38 |

FOREIGN PATENT DOCUMENTS

| | | |
|---|---|---|
| CN | 101857114 A | 10/2010 |
| CN | 101861487 A | 10/2010 |
| CN | 102124221 A | 7/2011 |
| CN | 102203421 A | 9/2011 |
| CN | 102740975 A | 10/2012 |
| CN | 105579082 A | 5/2016 |
| CN | 205581064 U | 9/2016 |
| CN | 208520821 U | 2/2019 |
| CN | 109444310 A | 3/2019 |
| CN | 110431413 A | 11/2019 |
| DE | 3347248 A1 | 7/1985 |
| DE | 102011001550 A1 | 9/2012 |
| EP | 0231566 | 8/1987 |
| EP | 0830534 A1 | 3/1998 |
| EP | 1887353 A1 | 2/2008 |
| FR | 1132654 A | 3/1957 |
| FR | 1144517 A | 10/1957 |
| GB | 873146 A | 7/1961 |
| GB | 2136926 A | 9/1984 |
| JP | 2004360667 A | 12/2004 |
| JP | 2017115886 A | 6/2017 |
| KR | 19990020616 U | 6/1999 |
| WO | 200118443 A1 | 3/2001 |
| WO | 2007119149 A2 | 10/2007 |
| WO | 2011085353 A1 | 7/2011 |

OTHER PUBLICATIONS

International Search Report and Written Opinion in PCT/US2020/062276 mailed on Mar. 10, 2021.
International Search Report and Written Opinion in PCT/US2020/062297 mailed on Feb. 26, 2021.
Notice of Allowance in U.S. Appl. No. 17/104,874 mailed on Jul. 3, 2023.
Notice of Allowance in U.S. Appl. No. 17/104,660 mailed on Jun. 30, 2023.
Non-Final Office Action in U.S. Appl. No. 17/104,660 mailed on Jun. 27, 2022.
Non-Final Office Action in U.S. Appl. No. 17/104,874 mailed on Aug. 22, 2022.
International Preliminary Report on Patentability in PCT/US2020/062258 mailed on Jun. 9, 2022.
International Preliminary Report on Patentability in PCT/US2020/062276 mailed on Jun. 9, 2022.
International Preliminary Report on Patentability in PCT/US2020/062297 mailed on Jun. 9, 2022.
Final Office Action in U.S. Appl. No. 17/104,874 mailed on Mar. 1, 2023.
Final Office Action in U.S. Appl. No. 17/104,660 mailed on Jan. 4, 2023.
Saunders, D.L., "A Versatle Gradient Elution Device for HPLC," Journal of Chromatographic Science, Mar./Apr. 1977. 8 pages.
Final Office Action in U.S. Appl. No. 17/104,772 mailed on Jan. 9, 2023.
Non-Final Office Action in U.S. Appl. No. 17/104,772 mailed on Sep. 21, 2022.
Restriction Requirement in U.S. Appl. No. 17/104,772 mailed on Jul. 15, 2022.
Non-Final Office Action in U.S. Appl. No. 17/104,772 mailed on Jul. 21, 2023.
Notice of Allowance in U.S. Appl. No. 17/104,772 mailed on Nov. 13, 2023.
Wu, et al. "Research on LCL filter applied to shunt active power filter" Electric Power Automation Equipment, Issue 1, 2007, pp. 17-20, 35.
Extended European Search Report in EP Patent Application No. 24212225.7 mailed on Apr. 30, 2025.

* cited by examiner

GRADIENT PROPORTIONING VALVE

RELATED APPLICATIONS

This application is a continuation of U.S. patent application Ser. No. 17/104,772, filed Nov. 25, 2020, which claims priority to U.S. Provisional Patent Application No. 62/941,236, filed Nov. 27, 2019, entitled "Gradient Proportioning Valve," the entireties of which are incorporated herein by reference.

FIELD OF THE INVENTION

The invention relates generally to gradient proportioning valves. More particularly, the invention relates to a gradient proportioning valve having dampening features, and associated systems and methods.

BACKGROUND

In liquid chromatography, solvent managers are used to deliver the mobile phase solvent to the rest of the instrument stack at very precise flow rates, pressures, and solvent compositions. In one example, quaternary solvent managers (QSMs) are a type of solvent manager that meters and mixes the solvents at low pressure before pressurizing and delivering the solvents to the rest of the instrument stack. Metering of the solvents at low pressure is commonly performed by a gradient proportioning valve (GPV).

GPVs are known for use in low pressure mixing liquid chromatography systems (i.e. quaternary systems). U.S. Pat No. 5,862,832 describes an exemplary prior art GPV. Specifically, the GPV is responsible in the systems for setting the desired solvent composition. A typical GPV includes multiple solenoid valves mounted on a common manifold that open and close at precise times with respect to the system pump cycle. Upon opening and closing of GPV solenoid valves, pressure pulses are introduced to the system. Pressure pulses are also caused by the start and end of the intake stroke during the pump cycle. Such pressure pulses can cause undesirable oscillations in the compositional error of chromatography systems. These oscillations therefore diminish compositional accuracy and performance of a liquid chromatography system.

Typical GPVs utilize compliant diaphragms or poppets to form a seal when toggling the inlet channels open and closed. Upon each actuation, undesirable pressure pulses are generated by the valve and are introduced to the solvent. These pressure pulses cause errors in solvent metering by the GPV, and therefore can impact compositional accuracy and users' chromatography methods. Some GPV designs utilize accumulator diaphragms upstream of each inlet channel to mitigate the pressure pulses introduced by the valve actuation. While these accumulator chambers improve performance, they are costly, require significant space in the manifold, and limit design freedom. There also may be a limit to the effectiveness of accumulator chambers as flow rate increases.

Therefore, an improved GPV that reduces or dampens undesirable pressure pulses would be well received in the art.

SUMMARY

In one embodiment, a gradient proportioning valve for liquid chromatography comprises: a plurality of inlet ports configured to receive a plurality of fluids; a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports; an actuation mechanism having a piston located within a bored structure surrounding the piston, the actuation mechanism configured to open and close at least one of the plurality of conduits in a controlled manner wherein the piston and the bored structure have a tight tolerance configured to create a fluid tight seal when the actuation mechanism closes the at least one of the plurality of conduits; and a common outlet port configured to receive the fluid composition.

Additionally or alternatively, the gradient proportioning valve further includes a separate actuation mechanism for each of the respective plurality of conduits, each of the separate actuation mechanisms having a piston located within a bore with a tight tolerance configured to create a fluid tight seal.

Additionally or alternatively, the piston and the bore create the fluid tight seal without a deformable sealing element.

Additionally or alternatively, the actuation mechanism is a solenoid valve.

Additionally or alternatively, the piston is made of ceramic.

Additionally or alternatively, the actuation mechanism is configured to open and close two or more of the plurality of the conduits.

Additionally or alternatively, the piston is configured to rotate about the bored structure to open and close the at least one of the plurality of conduits in the controlled manner.

Additionally or alternatively, the piston is configured to rotate less than 90 degrees to open and close the at least one of the plurality of conduits in the controlled manner.

Additionally or alternatively, the piston includes a flat surface keyed into one side.

Additionally or alternatively, the piston extends axially along a length, wherein the piston includes a hole extending axially within the piston configured to receive and outlet the fluid from the piston.

Additionally or alternatively, the tight tolerance creates a clearance of 5 microns or less between the piston and the bored structure.

Additionally or alternatively, the piston is configured to move axially within the bored structure to open and close the at least one of the plurality of conduits in the controlled manner.

Additionally or alternatively, the piston is configured to move axially and rotate relative the bored structure.

In another embodiment, a method of mixing fluid includes providing a gradient proportioning valve including a manifold having a plurality of conduits; receiving a plurality of fluids in a plurality of inlet ports of the gradient proportioning valve; opening and closing each of a plurality of conduits in a controlled manner with an actuation mechanism having a piston located within a bored structure surrounding the piston; maintaining a fluid tight seal between the piston and the bored structure during the opening and closing, wherein the piston and the bored structure have a tight tolerance configured to create the fluid tight seal; mixing the plurality of fluids in a controlled manner within the manifold of the gradient proportioning valve; and outputting the fluid composition from a common outlet port of the gradient proportioning valve.

Additionally or alternatively, the method further includes preventing unwanted fluidic pressure pulses in the manifold with the actuation mechanism through the minimization of internal fluid volumes within the piston and the bored structure.

Additionally or alternatively, the actuation mechanism is made of ceramic.

Additionally or alternatively, the method further includes opening, with the actuation mechanism, two or more of the plurality of conduits.

Additionally or alternatively, the method further includes rotating the piston about the bored structure to open and close the at least one of the plurality of conduits in the controlled manner.

Additionally or alternatively, the method further includes moving the piston axially within the bored structure to open and close the at least one of the plurality of conduits in the controlled manner.

Additionally or alternatively, the method further includes moving the piston both axially and with rotation relative to the bored structure.

In another embodiment, a liquid chromatography system comprises: a gradient proportioning valve for liquid chromatography comprises: a plurality of inlet ports configured to receive a plurality of fluids; a manifold connected to each of the plurality of inlet ports configured to mix the plurality of fluids in a controlled manner to provide a fluid composition, the manifold including a plurality of conduits internal to the manifold, each of the plurality of conduits receiving fluid through a respective one of the plurality of inlet ports; an actuation mechanism having a piston located within a bored structure surrounding the piston, the actuation mechanism configured to open and close at least one of the plurality of conduits in a controlled manner wherein the piston and the bored structure have a tight tolerance configured to create a fluid tight seal when the actuation mechanism closes the at least one of the plurality of conduits; and a common outlet port configured to receive the fluid composition; an injector; a separation column; and a detector.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
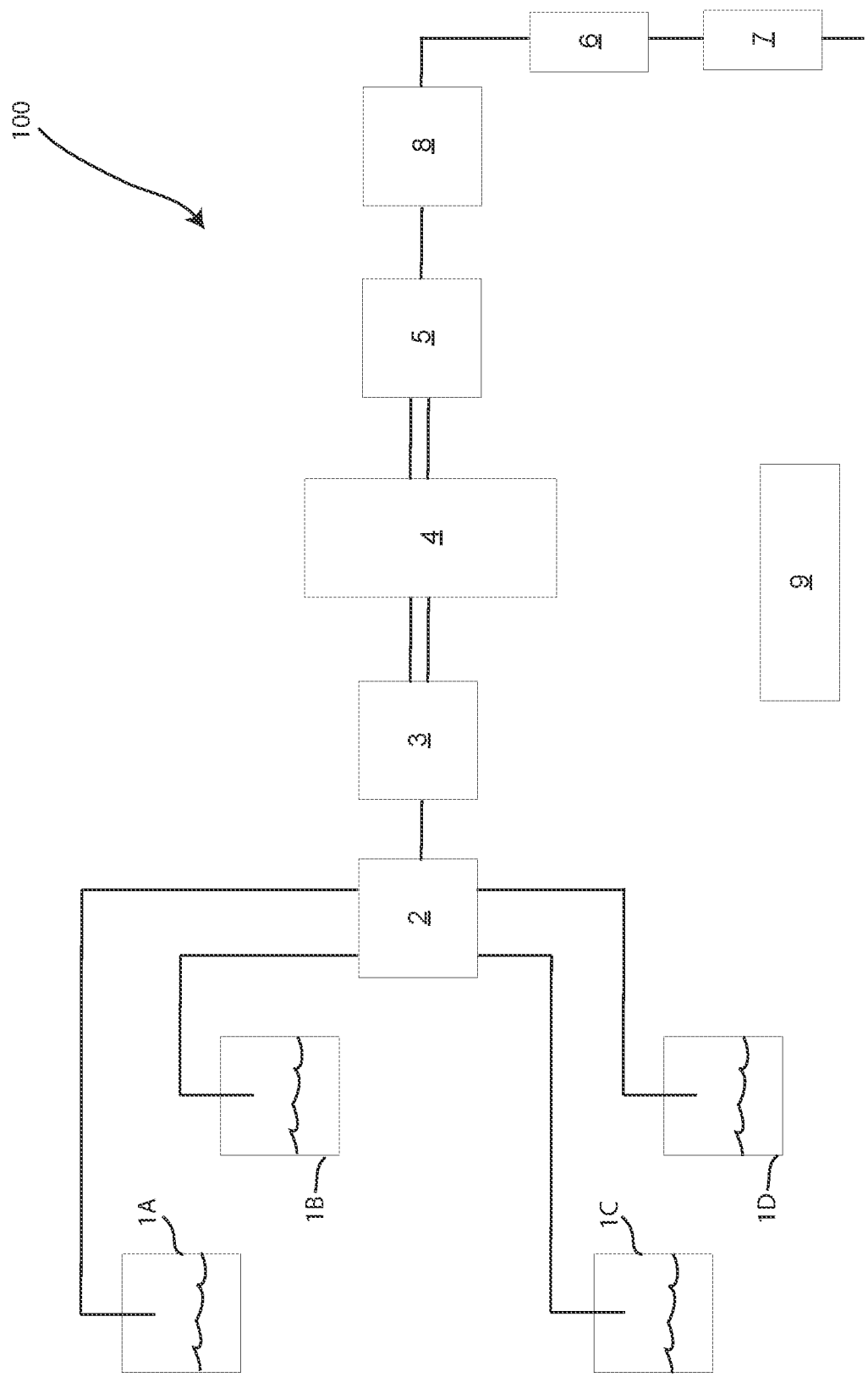
FIG. 1 depicts a block diagram of a liquid chromatography apparatus, in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

A gradient proportioning valve accommodates the flow of fluids from external reservoirs into the valve for mixing in appropriate proportions to form a liquid composition in liquid chromatography. The gradient proportioning valves described herein include inlet conduits in communication with one or more inlet valves that may be normally closed. An actuated mechanism may switch open in a controlled manner to provide the appropriate amount of fluid required in mixing the liquid composition. The function of the overall valve is to provide a continuous stream of a compositionally accurate mixture of components, such as solvents in a high-pressure liquid chromatography (HPLC) implementation. The mixture may be provided from the common outlet under flowing conditions, while not interfering with the flow rate of the fluid input system, and without changing or otherwise affecting the quality/composition of the fluids input for mixing.

Embodiments of the gradient proportioning valve described herein may be configured to dampen or otherwise reduce pressure pulses that occur due to the opening and closing of channels in the fluidic systems of the valve, and in the valve itself. Such pressure pulses have been found to cause large, sinusoidal oscillations in compositional error. Thus, the gradient proportioning valves described herein may be configured to provide improved compositional accuracy across an entire solvent composition range. This improved compositional accuracy may be particularly important at higher flow rates.

In the embodiments of the gradient proportioning valve described herein, the one or more actuation mechanisms that open and close the inlet conduits each include a plunger or piston mechanism that operates in conjunction with a bored structure. By manufacturing the plunger and bored structure with very tight tolerances, a seal is formed when the plunger is inserted into the bored structure. Using a high precision dimensioned plunger and bore structures as sealing mechanisms, the gradient proportioning valve reduces or minimizes volumes accumulating therein and results in little or no pressure pulses downstream from the actuation mechanism. As described herein, tight tolerances describe tolerances where clearances between the plunger and bored structure may be less than 6 microns. For example, in some embodiments, clearances between the plunger and the bored structure that are between 2 to 5 microns are contemplated. Such tight tolerances and low clearances may provide for a fluid tight seal without the need for deploying deformable sealing elements or other seals. Further, embodiments herein contemplate the use of ceramic materials for the piston and/or the surrounding bored structure.

FIG. 1 is a block diagram of an exemplary liquid chromatography system 100, suitable for preparative- or process-scale liquid chromatography, in accordance with one embodiment of the invention. The system 100 is an exemplary system within which gradient proportioning valves may be included according to the embodiments described herein. The apparatus 100 includes four solvent reservoirs 1A, 1B, 1C, 1D, a gradient proportioning valve 2, an inlet manifold valve 3, a pump 4, a solvent mixer 5, an injector 8, a separation column 6, a detector 7, and a control unit 9. The gradient proportioning valve 2 represents a valve that includes one or more of the dampening features described herein. Thus, the gradient proportioning valve 2 may be any of the gradient proportioning valves shown in FIGS. 2-12 and described herein below.

In operation, the gradient proportioning valve 2 and the pump 4, in response to control of the control unit 9, select and draw one or more solvents from the reservoirs 1A, 1B, 1C, 1D. The gradient proportioning valve 2 may be operated, in response to control of the control unit 9, to provide a selected solvent composition, which is optionally varied in time, for example, to implement gradient-mode chromatography. The solvent mixer 5 is any suitable mixer, including known passive and active mixers. The injector is any suitable injector 8, including known injectors, for injecting a sample into the solvent flow. The injector 8 is optionally disposed at alternative locations in the solvent flow path, as will be understood by one having ordinary skill in the liquid-chromatography arts. The inlet manifold valve 3 is connected to an outlet tube from the gradient proportioning valve 2, and to two inlet tubes connected to the pump 4, to supply solvent to the two piston chambers. The inlet manifold valve 3 optionally includes a sample injector, to inject samples into the solvent prior to its entry into the pump 4. The control unit 9—including, for example, a personal computer or workstation—receives data and/or provides control signals via wired and/or wireless communications to, for example, the gradient-proportioning valve 2, the pump inlet manifold 3, the pump 4, and/or the detector 7. The control unit 9 supports, for example, automation of sample processing. The control unit 9, in various illustrative embodiments, is implemented in software, firmware, and/or hardware (e.g., as an application-specific integrated circuit). The control unit 9 includes and/or is in communication with storage component(s).

Suitable implantations of the control unit 9 include, for example, one or more integrated circuits, such as microprocessors. A single integrated circuit or microprocessor in some alternative embodiments includes the control unit 9 and other electronic portions of the apparatus 100. In some embodiments, one or more microprocessors implement software that enables the functions of the control unit 9. In some embodiments, the software is designed to run on general-purpose equipment and/or specialized processors dedicated to the functionality herein described.

In some implementations of the system 100, the control unit 9 includes a user interface to support interaction with the control unit 9 and/or other portions of the system 100. For example, the interface is configured to accept control information from a user and to provide information to a user about the system 100. The user interface is used, for example, to set system control parameters and/or to provide diagnostic and troubleshooting information to the user. In one embodiment, the user interface provides networked communication between the system 100 and users located either local to the operating environment or remote from the operating environment. The user interface in some implementations is used to modify and update software. In view of the description of illustrative embodiments provided herein, it will be apparent to one having ordinary skill in the separation arts that various other configurations and implementations of control units can be utilized in other embodiments of the invention to provide automated control of process-scale and preparative-scale chromatography.

The pump 4 may be configured to provide solvent at pressures of at least 500 psi, or 1,000 psi, or 5,000, psi 10,000 psi or greater. The pump includes any suitable piston-based pump, including known pumps, such as available from Waters Corporation, Milford, Mass. The column 6 is any column suitable for process-scale and preparative-scale chromatography. The column contains, for example, any medium suitable for such a purpose, including known media. The sorbent material is selected from any suitable sorbent material, including known materials such as silica or a mixture of silica and a copolymer such as an alkyl compound. The solvents are any solvents suitable to a desired separation process, including known solvents.

Again, the system 100 described above is meant to be an exemplary liquid chromatography system in which various embodiments of the gradient proportioning valves may be deployed. However, the gradient proportioning valves described herein may be implemented in any system in which gradient fluid mixing is performed. For example, in a liquid chromatography quaternary system, after the solvent reservoirs 1A, 1B, 1C, 1D, the next component the solvent goes into may be a degasser chamber. From there, the solvent may enter the gradient proportioning valve 2. After the gradient proportioning valve 2, the solvent may then go through a check valve to the pump (i.e. with no inlet manifold valve). Any liquid chromatography system configurations that deploy a gradient proportioning valve are contemplated for incorporation of the principles described herein.

Figure 2:
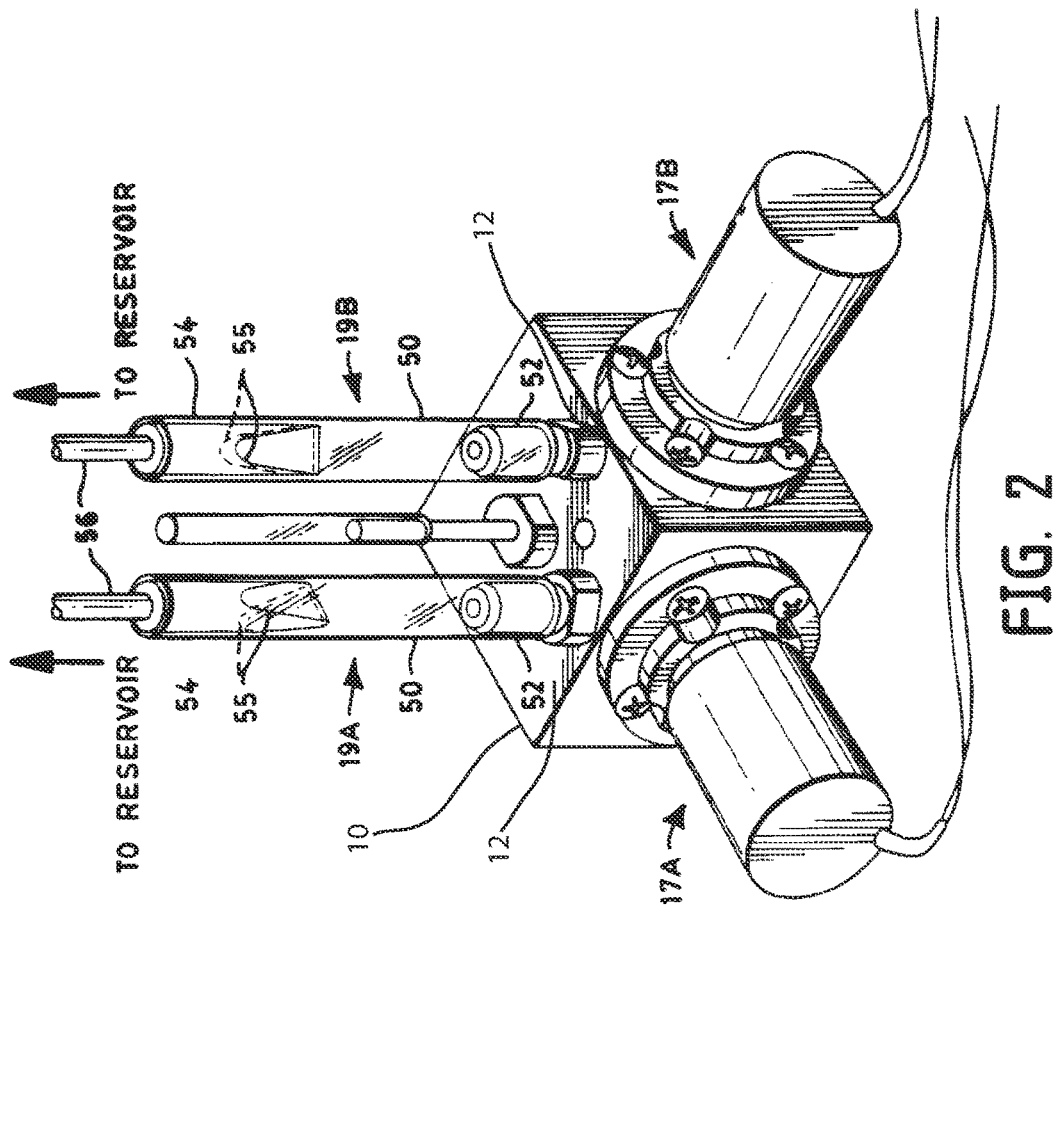
FIG. 2 depicts a perspective view of a gradient proportioning valve, in accordance with one embodiment.

Referring now to FIG. 2, a perspective view of a gradient proportioning valve 2A is shown, in accordance with one embodiment. The gradient proportioning valve 2A includes accumulators 19A, 19B located directly adjacent to switching valves 17A, 17B, on the side closest to the reservoirs 10A, 10B. It should be understood that embodiments of the gradient proportioning valve 2A may include two additional accumulators and switching valves (not shown) located on the two open sides of the gradient proportioning valve 2A, thereby connecting the gradient proportioning valve 2 to two additional reservoirs, such as the reservoirs 1C, 1D shown in FIG. 1. Each of the accumulators 19A, 19B may include a soft-walled flexible plastic tube 50 of generally circular cross-section. As shown, the accumulator tube 50 may be adapted at an end closest to the valve inlet to snugly slide over a rigid plastic connector 52. A connecting tube 54 may be implemented at the opposite end of the accumulator tube to hold a relatively long length of flow tubing 56 that connects the valves with the reservoirs 1A, 1B. The end of the accumulator tube adjacent to the connecting tube may be caused to assume approximately the cross-section of a flattened ellipse 55 which may allow a significant internal volume change to occur in the accumulator tube, with little change in pressure thereby allowing the accumulator to overcome the effects of hydraulic inertia.

Figure 3:
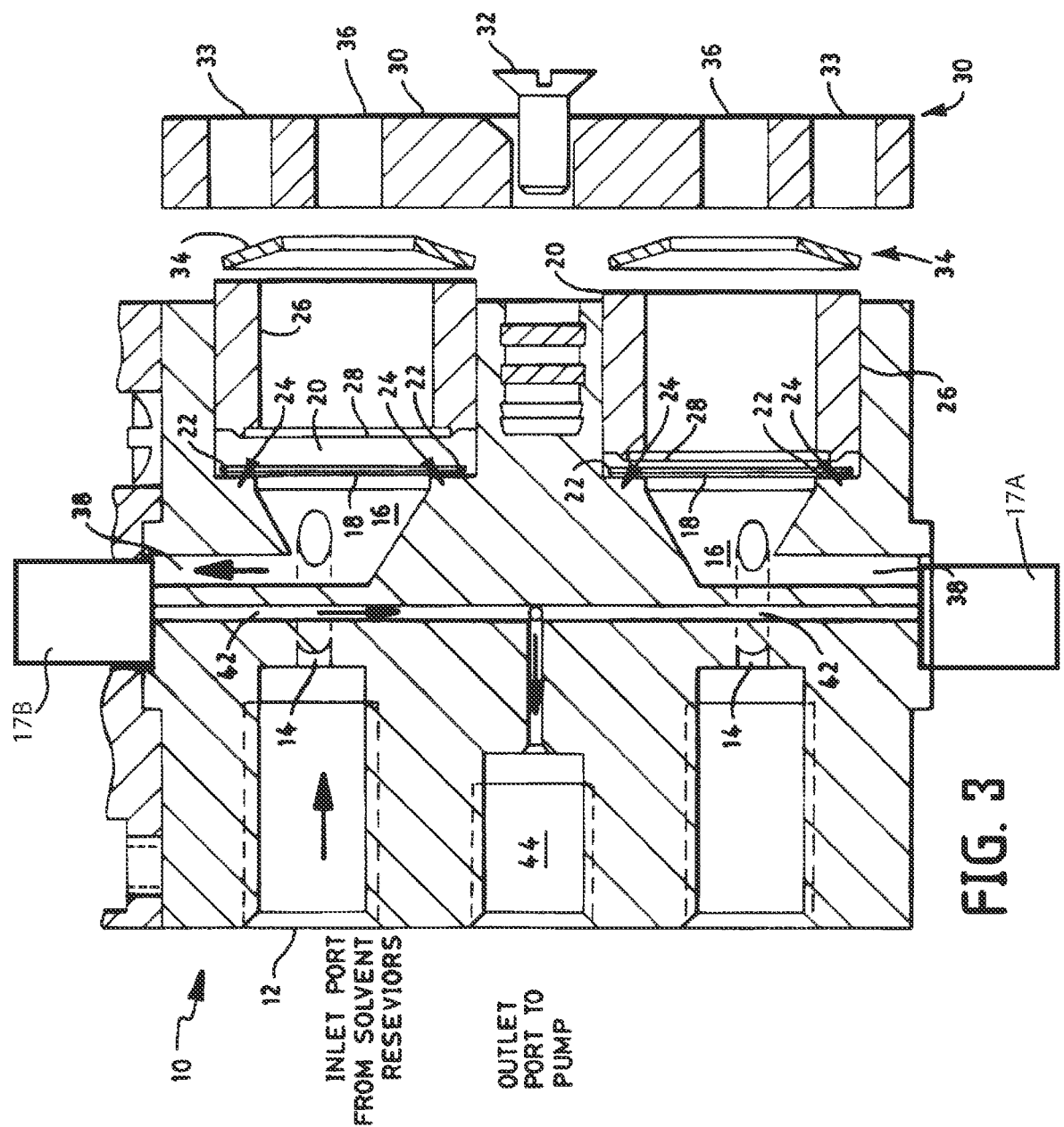
FIG. 3 depicts a side cross sectional view of the gradient proportioning valve of FIG. 2, in accordance with one embodiment.

FIG. 3 depicts a side cross sectional view of the gradient proportioning valve 2A of FIG. 2, in accordance with one embodiment. The gradient proportioning valve 2A includes a valve manifold 10 that accommodates the flow of fluids from external reservoirs (not shown). For the sake of clarity of the discussion hereinafter, the illustrative valve described herein has the capacity to mix only two input fluid streams. However, the features described herein may be applied to valves mixing, for example, four or more input fluid streams. The input fluid streams to be mixed are received from the reservoirs and are introduced into the valve at inlet ports 12. Fluids from the respective reservoirs, such as solvents used in HPLC as known in the art, flow into respective inlet ports 12 and thereafter flow through respective inlet conduits 14 in the manifold 10 into respective accumulator volumes or chambers 16. While the embodiment shown in FIG. 3 includes the accumulator volumes or chambers 16, other embodiments contemplated herein may not include accumulator chambers 16. Such embodiments may include an inlet port that provides fluid directly to the switching valves 17A, 17B without first passing through an accumulator chamber.

As shown, the integral accumulator chambers 16, as well as the inlet ports 12 and inlet conduits 14, are appropriately dimensioned as a function of the flow rate of the valve application. The chamber 16 is frustum-shaped having a conical-base opposed to the inlet conduit 14. The chamber is shaped to maximize the surface area of the diaphragm (for compliance), and the inlet conduit 14 is positioned to allow for the best swept volume geometry. Accordingly, the chamber 16 also has a smooth transition from larger to smaller cross-section. The placement of the chamber is such that the fluidic resistance between the switching valves 17A, 17B and the accumulator is minimized. Fluid flowing through the conduit 14 flows perpendicular to the conical-base, into the chamber 16 to confront the base or back of the chamber 16.

An accumulator diaphragm 18 is positioned at the conical-base or back of the chamber 16, opposite the inlet conduit 14. The diaphragm 18 in this illustrative embodiment, is a 0.002 inch thick film formed of Polytetrafluoroethylene (PTFE) laminated on each side with Fluorinated Ethylene Propylene (FEP). The diaphragm 18 effects a membrane or compliant member at the back of the accumulator chamber 16 to allow internal volume changes in the chamber to occur with little change in pressure.

An oversized bore 20 behind the back of the conical-base or back of the accumulator chamber 16 is configured to receive the diaphragm 18 for clamping and sealing the diaphragm tightly therein. A seating surface 22 interior to the bore 20 provides an abutment against which the diaphragm seats. A sealing groove 24 is disposed in the seating surface 22 and provides a portion of the single seal effected in the implementation according to the invention. A cylindrical sealing plug 26 formed of stainless steel, includes a sealing ridge 28 that fits tightly into the sealing groove 24 to seal the diaphragm in the bore 20 when the plug 26 is engaged against the seating surface 22 with the diaphragm sandwiched therebetween.

Preferably, the sealing plug 26 is dimensioned to fit snugly, yet slidably within the bore 20. The plug 26 is held in place by a clamping plate 30 which is mechanically attached to the valve manifold such as by a screw 32. Additional mounting holes 33 are provided in the clamping plate 30 to facilitate the mechanical fastening of the clamping plate to the valve manifold 10. In this illustrative embodiment, resilient members such as belleville springs 34 or washers are disposed between the sealing plug 26 and the clamping plate 30, to provide some resiliency.

The diaphragm may overcome hydraulic inertia while minimizing the volume of fluid in the valve that is exposed to potential air permeation, by limiting the surface area of the diaphragm that is exposed to ambient air. Atmospheric ports 36 are provided in the clamping plate 30 to permit ambient air at the back of the diaphragm 18. While exposure to ambient air is desirable for the diaphragm, the reduced surface area exposed within the atmospheric ports significantly limits permeation of air through the diaphragm.

Thus, in operation the input fluid streams to be mixed are received from reservoirs and are introduced into the valve manifold 10 at inlet ports 12. Fluids from the respective reservoirs flow into respective inlet ports 12 and thereafter flow through respective inlet conduits 14 in the manifold 10 into respective accumulator volumes or chambers 16. The fluids to be mixed flow out of the chambers 16 through chamber ports 38 whereupon the fluids are available at the switching valves 17A, 17B. The switching valves 17A, 17B operate in accordance to the principles of the invention described herein below. The controlled switching of the switching valves 17A, 17B determines the proportion of a respective fluid that is received in a common port 42 within the valve manifold 10. The respective fluids are mixed in their respective proportions in the common port 42 and are available at an outlet port 44 for downstream processing as known in the art.

Although only a two input valve embodiment is described in FIG. 3, it will be appreciated that the concepts according to the invention could be implemented in a valve having any number of inlet ports for mixing a liquid composition. Further, while the embodiment described herein includes a single switching valve 17A, 17B per inlet port 12, in other embodiments a single switching valve 17A, 17B may operate to open and close a plurality of inlet ports 12, as described herein below.

Figure 4:
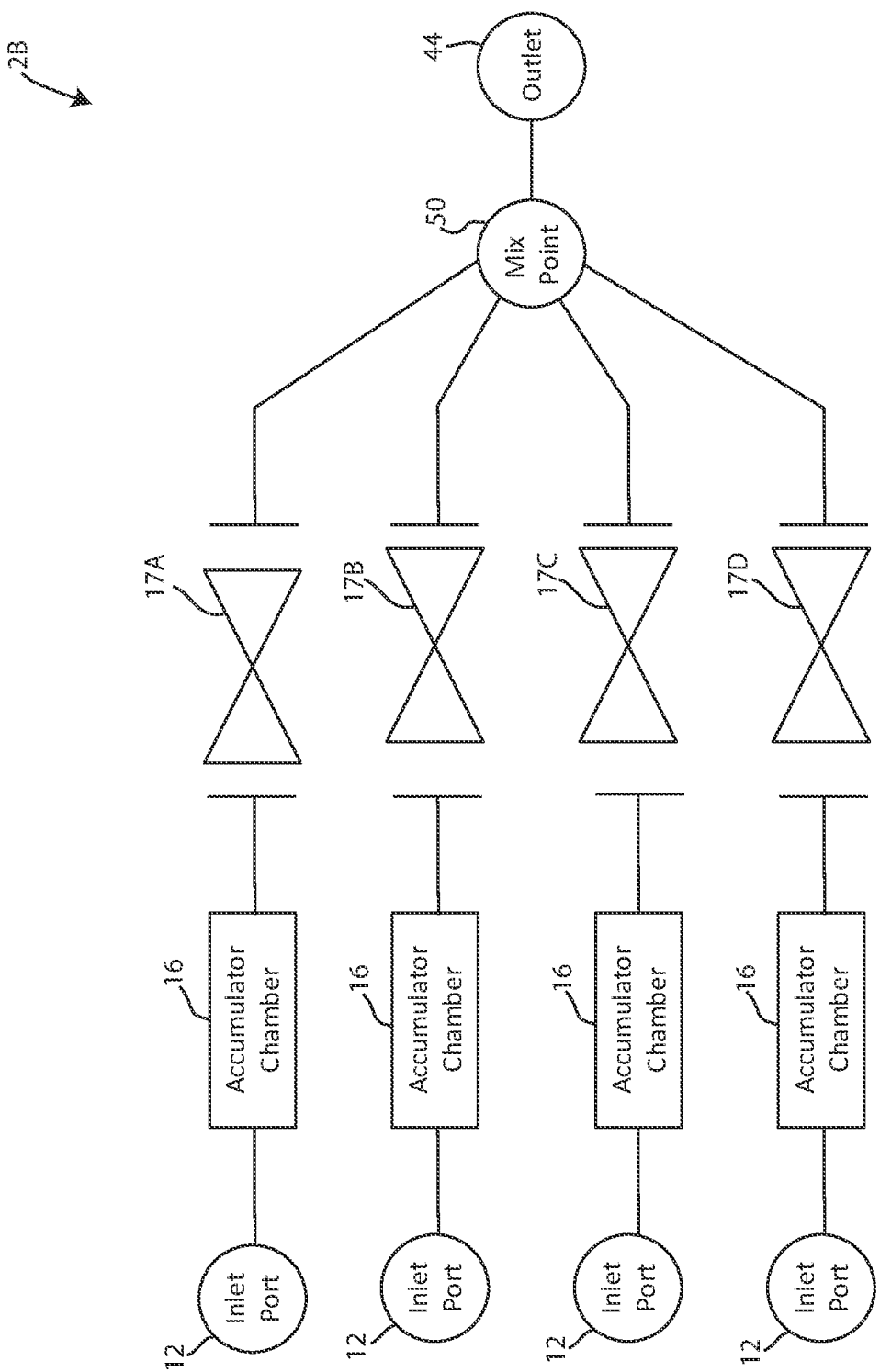
FIG. 4 depicts a schematic view of the gradient proportioning valve of FIGS. 2-3, in accordance with one embodiment.

FIG. 4 depicts a schematic view of another gradient proportioning valve 2B, in accordance with one embodiment. The gradient proportioning valve 2B is shown schematically including four separate inlet ports 12 which provide fluid via a conduit or channel to an accumulator chamber 16, such as the chamber 16 shown in FIG. 3. Unlike FIG. 3, in the embodiment shown in FIG. 4 there are four separate accumulator chambers 16 to accommodate the four inlet ports 12. Further, downstream from each of the accumulator chambers 16 is a separate switching valve 17A, 17B, 17C, 17D. The four switching valves 17A, 17B, 17C, 17D each separately outlet fluid to a downstream mix point 50 at which the fluid is combined into a single stream. Downstream from the mix point 50 is an outlet 44.

FIG. 4 shows one example schematic view of the gradient proportioning valve 2B where each inlet channel includes its own valve 17A, 17B, 17C, 17D. Further, the schematic shows one accumulator chamber 16 for each inlet port 12. In other embodiments contemplated, no accumulator chamber 16 may be needed prior to the mixing valves 17A, 17B, 17C, 17D. In still other embodiments, such as those described hereinbelow, an accumulator chamber and switching valve combination can be configured to receive more than one inlet, such as a single accumulator chamber and switching valve for two or more inlets. However, for the embodiment shown in FIG. 4 displays situations in which a single actuation mechanism may be used for each inlet port. Such a schematic can be used to describe embodiments consistent with the actuation mechanisms shown in FIGS. 5-8 and described hereinbelow.

Described hereinbelow are several embodiments contemplated for actuation mechanisms for a switching valve, such as one of the switching valves 17A, 17B, 17C, 17D described above. The embodiments of the actuation mechanisms for switching valves described hereinbelow with respect to FIGS. 5-9, 11, 12 and 14 may be implemented via any switching valve mechanism that is configured to move the piston relative to the bored structure or cylinder. For example, the rotational movements of the piston relative to the bored structure may be actuated by a stepper motor, a servo motor, or any other rotational actuator. Axial movement could be controlled by a solenoid, voice coil, piezoelectric actuator, or any other axial actuator. Further, while the embodiments below describe various forms of actuation mechanisms for switching the flow of fluid, other embodiments are contemplated that are consistent with the principles described herein.

Further, the embodiments described below may use ceramic materials for the piston and/or the bored structure. The pistons and bored structures may be manufactured with tight tolerances in order to produce clearances less than 6 microns. Tight tolerances may provide for fluid tight seals between the conduits of the actuation mechanism, without using additional deformable sealing elements between the components. Depending on the exact requirements of a particular design, the tolerances and material properties of the embodiments described herein may change. For example, operating pressure, piston and/or bore size, choice of material, and the like, could all impact the ability to achieve sealing via precision machined parts without the use of an external seal component (e.g. a deformable seal).

Ceramic materials may be particularly advantageous in the embodiments described herein due to their ability to manufacture with extremely tight tolerances. Further, the high hardness of ceramics, along with the resistance to wear and corrosion and oxidation of ceramics, may make ceramic materials particularly advantageous. Ceramics may also prevent the introduction of undesirable temperature effects. However, other chemically inert metals or other materials are contemplated. Examples of other materials may include stainless steel such as Nitronic 60, Titanium, Nickel-Cobalt base alloys such as MP35N®, Tantalum or the like.

The bored structures in the embodiments below are shown having various inlet and outlet conduits that allow fluid to flow through the piston-occupied zone of the actuation mechanism. While the inlet and outlet conduits are shown as openings in the bored structures in each cross sectional view shown below in FIGS. 5-9, 11, 12 and 14, it should be understood that a manifold or housing may be attached to the exterior of the bored structures of each embodiment for connecting external fluid conduits thereto. Such a manifold or housing may be, for example, made from a different material such as plastic. The bored structure could be housed in the plastic manifold in a variety of ways, including but not limited to being pressed in, thermally shrinking the plastic manifold around the bore, or the like. Housing the bored structure in this way may provide for ease of connecting and aligning the ceramic (or other material) inlets and outlets with the inlet and outlet channels of solvent lines in a liquid chromatography system.

Further, while the embodiments described hereinbelow in FIGS. 5-9, 11, 12 and 14 are shown where the pistons and respective bored structures are cylindrical in shape and structure, it is also conceivable that the pistons and bored structures described herein may take the form of various shapes not limited to cylinders. Further, while the pistons are described as being the moving components in the embodiments described hereinbelow, it should also be understood that the bored structures could be the component that moves, rather than the piston. It should be understood that the embodiments contemplated herein require relative movement between the pistons and their respective bored structures, but that movement of either or both of these components could create the requisite relative movement.

While not shown in the cross sectional views below, the actuation mechanisms described herein may utilize one or more hard stop features to facilitate alignment between the pistons with their respective bored structures and help to control and prevent unwanted movement. In embodiments that utilize hard stop features, impact absorbing material could be added to any of these hard stop features to reduce wear.

Figure 5:
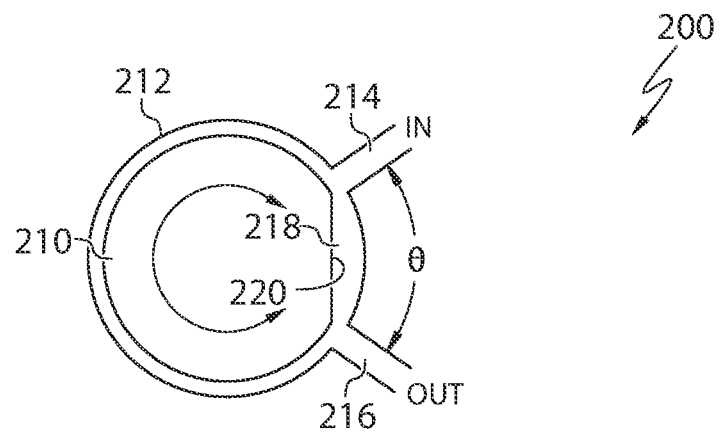
FIG. 5 depicts a schematic cross-sectional view of an actuation mechanism for a switching valve, in accordance with one embodiment.

Referring now to FIG. 5, a schematic cross-sectional view of an actuation mechanism 200 for a switching valve is depicted in accordance with one embodiment. The actuation mechanism 200 includes a piston 210 located within a bored structure 212. An inlet conduit 214 and an outlet conduit 216 provide fluid through the actuation mechanism 200. The piston 210 includes a keyed flat surface 220 cut out therefrom, which creates an open space 218 between the piston 210 and the bored structure 212. While there is a space shown between the piston 210 and the bored structure 212, it should be understood that the invention contemplates utilizing extremely tight clearances between the piston 210 and the bored structure 212 so that almost no space exists therebetween. Again, clearances of less than 6 microns are contemplated in order to retain a fluid tight seal when the piston 210 is rotated to close off one or more of the inlet and the outlet conduits 214, 216 without using any external sealing components or deformable seals.

While only a top cross sectional view of the actuation mechanism 200 is shown, it should be understood that the actuation mechanism includes an appropriate depth to accommodate the inlet and outlet conduits 214, 216 and to accommodate the attachment of the piston 210 to a motor for effectuating rotational movement. While the depth of the piston 210 and bored structure 212 may be greater than the amount needed to accommodate the inlet and outlet conduits 214, 216, the keyed flat surface 220 and the open space 218 may be particularly fashioned with a depth that corresponds to the depth needed to accommodate the inlet and outlet conduits 214, 216 in order to minimize the volume of the open space 218.

The actuation mechanism 200 may be configured to open and close the inlet and outlet conduits 214, 216 via rotation of the piston 210 about the bored structure 212. The position in FIG. 5 shows the actuation mechanism 200 in an open state whereby fluid can flow through the inlet 214 into the open space 218 created by the keyed flat surface 220 of the piston 210. Clockwise rotation from this open position would close the inlet conduit 214, while counter-clockwise rotation would close the outlet. The actuation mechanism 200 may deploy either of these rotations in order to effectuate opening and closing of the conduits 214, 216. Moreover, the angle θ is shown, which defines the rotational distance between the inlet conduit 214 and the outlet conduit 216. It may be desirable to include a relatively small angle θ that is less, for example, than 90 degrees, in order to reduce the size of the open space 218 in the system. Reducing the size of this open space 218 and quickly opening and closing the inlets via a small angle θ may help to reduce or eliminate pressure pulses created by the actuation mechanism 200.

Figure 6:
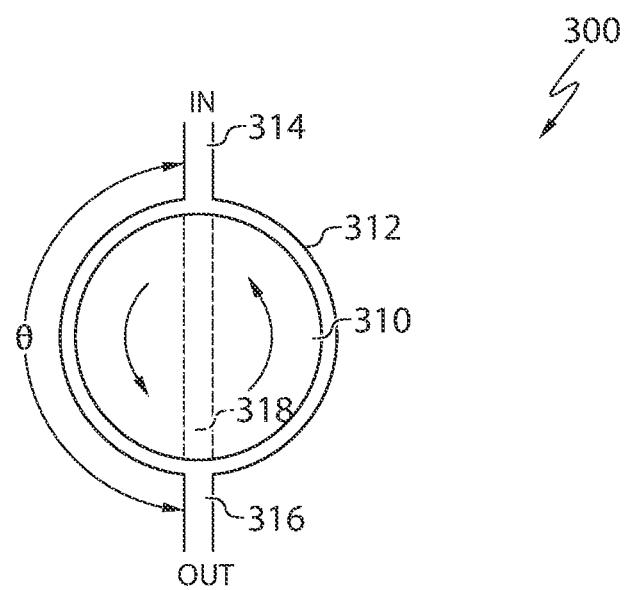
FIG. 6 depicts a schematic cross-sectional view of an actuation mechanism for a switching valve, in accordance with one embodiment.

FIG. 6 depicts a schematic cross-sectional view of another actuation mechanism 300 for a switching valve, in accordance with one embodiment. The actuation mechanism 300 includes a piston 310 located within a bored structure 312. An inlet conduit 314 and an outlet conduit 316 provide fluid through the actuation mechanism 300. The piston 310 includes a conduit 318 that extends therethrough to connect the inlet conduit 314 with the outlet conduit 316 when the piston 310 is in the relative position to the bored structure 312 that is shown. Like the previous embodiments, clearances of less than 6 microns are contemplated between the piston 310 and the bored structure 312 in order to retain a fluid tight seal when the piston 310 is rotated to close off the inlet and outlet conduits 314, 316 without using any external sealing components or deformable seals.

While only a top cross sectional view of the actuation mechanism 300 is shown, it should be understood that the actuation mechanism includes an appropriate depth to accommodate the inlet and outlet conduits 314, 316 and to accommodate the attachment of the piston 310 to a motor for effectuating rotational movement. The actuation mechanism 300 may be configured to open and close the inlet and outlet conduits 314, 316 via rotation of the piston 310 about the bored structure 312 in either direction relative to the position shown. The position in FIG. 6 shows the actuation mechanism 300 in an open state whereby fluid can flow from the inlet conduit 314 through the conduit 318 of the piston 310 and out of the actuation mechanism 300 through the outlet conduit 316. The actuation mechanism 200 may deploy either clockwise or counterclockwise rotation in order to effectuate opening and closing. Moreover, the angle θ between the inlet conduit 314 and the outlet conduit 316 is shown to be 180 degrees, creating a straight line through the actuation mechanism 300 when the actuation mechanism 300 is open. Such an embodiment may reduce the amount of rotation necessary to open and close the valve. However, including this straight-line approach is only feasible when there is a single inlet and a single outlet for each actuation mechanism 300.

Figure 7:
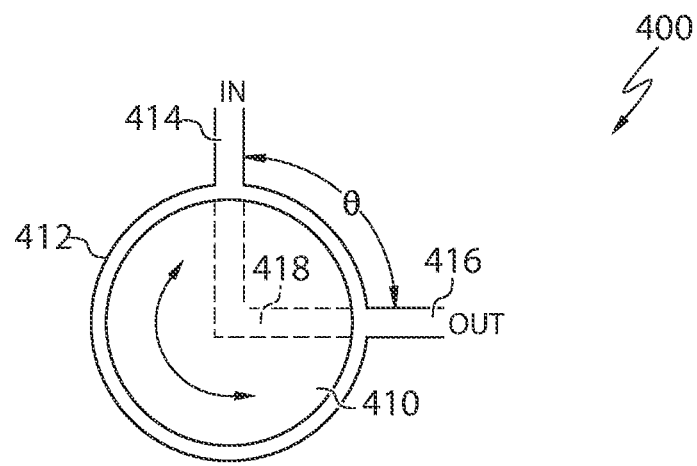
FIG. 7 depicts a schematic cross-sectional view of an actuation mechanism for a switching valve, in accordance with one embodiment.

FIG. 7 depicts a schematic cross-sectional view of another actuation mechanism 400 for a switching valve, in accordance with one embodiment. The actuation mechanism 400 includes a piston 410 located within a bored structure 412. An inlet conduit 414 and an outlet conduit 416 provide fluid through the actuation mechanism 400. The piston 410 includes a conduit 418 that extends therethrough to connect the inlet conduit 414 with the outlet conduit 416 when the piston 410 is in the relative position to the bored structure 412 that is shown. The conduit 418 of the piston 410 may be fashioned by drilling two perpendicular holes into the piston 410 that are 90 degrees apart and which meet in the middle of the piston 410. Like the previous embodiments, clearances of less than 6 microns are contemplated between the piston 410 and the bored structure 412 in order to retain a fluid tight seal when the piston 410 is rotated to close off the inlet and outlet conduits 414, 416 without using any external sealing components or deformable seals.

While only a top cross sectional view of the actuation mechanism 400 is shown, it should be understood that the actuation mechanism includes an appropriate depth to accommodate the inlet and outlet conduits 414, 416 and to accommodate the attachment of the piston 410 to a motor for effectuating rotational movement. The actuation mechanism 400 may be configured to open and close the inlet and outlet conduits 414, 416 via rotation of the piston 410 about the bored structure 412 in either direction relative to the position shown. The position in FIG. 7 shows the actuation mechanism 400 in an open state whereby fluid can flow from the inlet conduit 414 through the conduit 418 of the piston 410 and out of the actuation mechanism 400 through the outlet conduit 416. The actuation mechanism 400 may deploy either clockwise or counterclockwise rotation in order to effectuate opening and closing. Moreover, the angle θ between the inlet conduit 414 and the outlet conduit 416 is shown to be 90 degrees, creating a perpendicular angle within the piston 410 through which the fluid must flow to exit from the outlet conduit 416 when the actuation mechanism 400 is open. This change in flow direction may be desirable in reducing pressure pulses from opening and closing downstream from the actuation mechanism 400. This embodiment may function similar to the embodiment of FIG. 6, whereby the amount of rotation necessary to open and close the valve is reduced relative to the embodiment of FIG. 5. However, including this approach is only feasible when there is a single inlet and a single outlet for each actuation mechanism 300.

Figure 8:
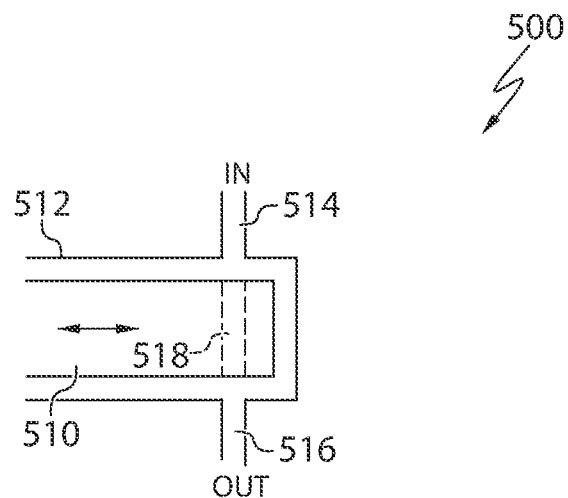
FIG. 8 depicts a schematic cross-sectional view of an actuation mechanism for a switching valve, in accordance with one embodiment.

FIG. 8 depicts a schematic cross-sectional view of another actuation mechanism 500 for a switching valve, in accordance with one embodiment. The actuation mechanism 500 includes a piston 510 located within a bored structure 512. An inlet conduit 514 and an outlet conduit 516 provide fluid through the actuation mechanism 500. The piston 510 includes a conduit 518 that extends therethrough to connect the inlet conduit 514 with the outlet conduit 516 when the piston 510 is in the relative position to the bored structure 512 that is shown. Like the previous embodiments, clearances of less than 6 microns are contemplated between the piston 510 and the bored structure 512 in order to retain a fluid tight seal when the piston 510 is moved to close off the inlet and outlet conduits 514, 516 without using any external sealing components or deformable seals. Unlike the previous embodiments, movement to open and close the actuation mechanism 500 of the piston 410 relative to the bored structure 512 is axial rather than rotational.

While only a side cross sectional view of the actuation mechanism 500 is shown, it should be understood that the actuation mechanism includes an appropriate depth to accommodate the inlet and outlet conduits 514, 516 and to accommodate the attachment of the piston 510 to a motor for effectuating axial movement. The actuation mechanism 500 may be configured to open and close the inlet and outlet conduits 514, 516 via axial movement of the piston 510 relative to the bored structure 512 in either direction relative to the position shown. The position in FIG. 6 shows the actuation mechanism 500 in an open state whereby fluid can flow from the inlet conduit 514 through the conduit 518 of the piston 510 and out of the actuation mechanism 500 through the outlet conduit 516. While the previous embodiments may deploy rotational movement via a stepper motor, servo motor, or other rotational actuator, the embodiment shown in FIG. 8 may be controlled via a solenoid, voice coil, piezoelectric motor or other axial movement system.

Figure 9:
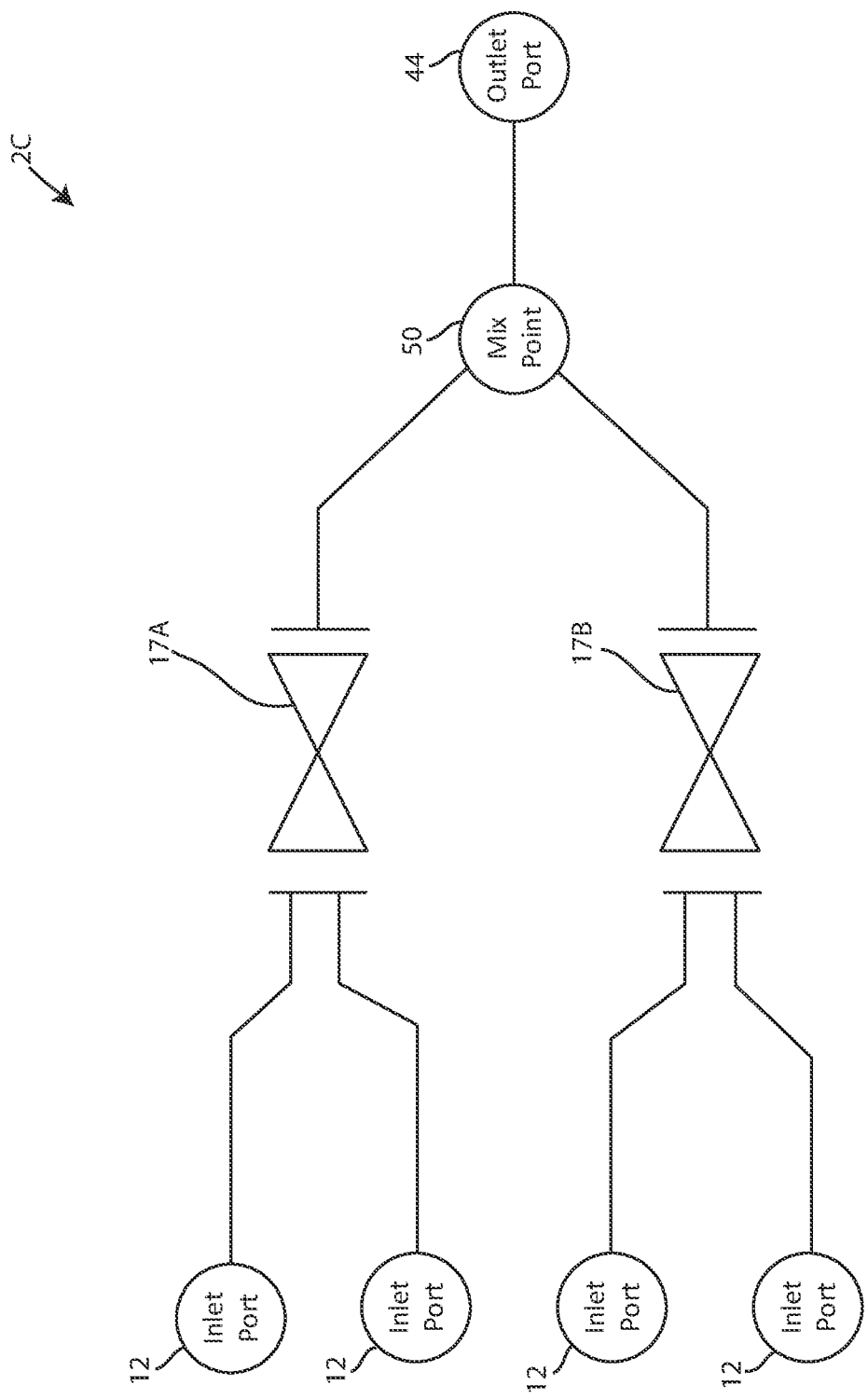
FIG. 9 depicts a schematic view of another gradient proportioning valve, in accordance with one embodiment.

FIG. 9 depicts a schematic view of another gradient proportioning valve 2C, in accordance with one embodiment. The gradient proportioning valve 2C is shown schematically including four separate inlet ports 12 which provide fluid via a conduit or channel to two separate switching valve 17A, 17B. As shown, each switching valve 17A, 17B is configured to receive fluid from two separate inlet ports 12 and provide a single outlet from the respective switching valves 17A, 17B. The single outlets of the two separate switching valves 17A, 17B each separately outlet fluid to a downstream mix point 50. At the mix point 50, the fluid is combined into a single stream from the two separate streams received from the switching valves 17A, 17B. Downstream from the mix point 50 is an outlet 44.

FIG. 9 shows one example schematic view of the gradient proportioning valve 2C where two inlet channels are connected to one valve 17A, 17B. Further, the schematic shows no accumulator chambers 16. In other embodiments contemplated, accumulator chambers may exist for each inlet port 12 prior to providing the fluid to the switching valves 17A, 17B. The schematic having two inlet channels for each valve can be used to describe embodiments consistent with the actuation mechanisms shown in FIGS. 10-12 and described hereinbelow.

Figure 10:
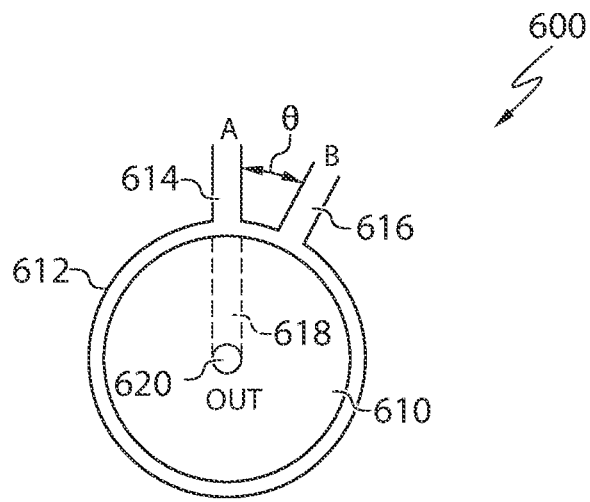
FIG. 10 depicts a schematic cross-sectional view of an actuation mechanism for a switching valve, in accordance with one embodiment.

FIG. 10 depicts a schematic cross-sectional view of another actuation mechanism 600 for a switching valve, in accordance with one embodiment. The actuation mechanism 600 includes a piston 610 located within a bored structure 612. A first inlet conduit 614 and a second inlet conduit 616 provide fluid to the actuation mechanism 600 from different fluid sources. The piston 610 includes a conduit 618 that extends from exterior of the piston 610 into the middle of the piston 610. An outlet conduit 620 is drilled axially through the piston 610 to allow fluid to flow out of the actuation mechanism 600. Like the previous embodiments, clearances of less than 6 microns are contemplated between the piston 610 and the bored structure 612 in order to retain a fluid tight seal when the piston 610 is rotated to close off the inlet and outlet conduits 414, 416 without using any external sealing components or deformable seals.

While only a top cross sectional view of the actuation mechanism 600 is shown, it should be understood that the actuation mechanism includes an appropriate depth to accommodate the inlet and outlet conduits 614, 616, to accommodate the attachment of the piston 610 to a motor for effectuating rotational movement, and to accommodate connecting the outlet 620 of the piston 610 to the rest of a downstream liquid chromatography system.

The actuation mechanism 600 may be configured to open and close the respective first and second inlet conduits 614, 616 via rotation of the piston 610 about the bored structure 612. The position in FIG. 10 shows the actuation mechanism 600 in a state where the first inlet conduit 614 is in an open state whereby fluid can flow from the inlet conduit 614 through the conduit 618 of the piston 610 and out of the axially drilled outlet conduit 620 of the piston 610. The actuation mechanism 600 may deploy either clockwise or counterclockwise rotation on the piston 610 relative to the bored structure 612 in order to effectuate opening and closing. For example, clockwise rotation may move the piston 610 from opening the first inlet 614 to opening the second inlet 616. Alternatively, from the position shown, a counterclockwise rotation may close both the first and second inlets 614, 616. In the embodiment shown, the closed state may also occur when the piston 610 is rotated so that the outlet of the conduit 618 is facing the wall of the bored structure 612 that is located between the first and second inlets 614, 616. The present embodiment contemplates the actuation mechanism 600 being able to toggle between two separate inlets 614, 616, with one inlet open at a given time, and whereby the actuation mechanism always includes the same outlet 620.

Moreover, the angle θ between each of the first and second inlet conduits 614, 616 defines the rotational distance between the first inlet conduit 614 and the second inlet conduit 616. It may be desirable to include a relatively small angle θ0 that is less, for example, than 90 degrees, in order to allow for the actuation mechanism 600 to toggle between positions more quickly. This may help to reduce or eliminate pressure pulses created by the actuation mechanism 600.

Figure 11:
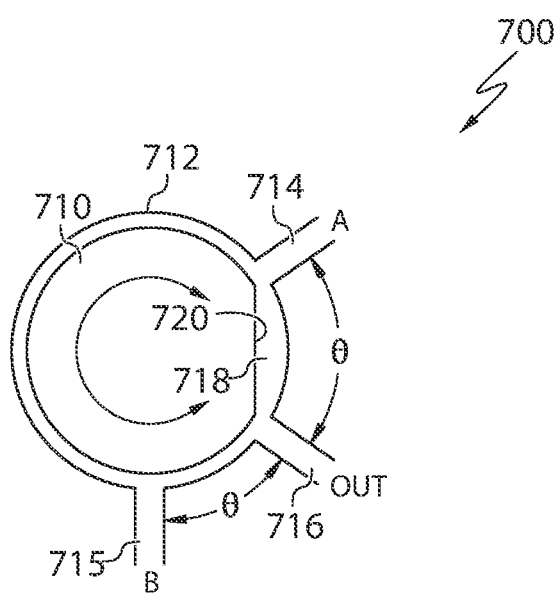
FIG. 11 depicts a schematic cross-sectional view of an actuation mechanism for a switching valve, in accordance with one embodiment.

FIG. 11 depicts a schematic cross-sectional view of another actuation mechanism 700 for a switching valve, in accordance with one embodiment. The actuation mechanism 700 includes a piston 710 located within a bored structure 712. A first inlet conduit 714 and a second inlet conduit 715 in the bored structure 712 provide fluid to the actuation mechanism 700 from different fluid sources. The bored structure 712 further includes an outlet conduit 716 located between the first and second inlet conduits 714, 715. The piston 710 includes a keyed flat surface 720 cut out therefrom, which creates an open space 718 between the piston 710 and the bored structure 712. While there is a space shown between the piston 710 and the bored structure 712, it should be understood that the invention contemplates utilizing extremely tight clearances between the piston 710 and the bored structure 712 so that almost no space exists therebetween. Again, clearances of less than 6 microns are contemplated in order to retain a fluid tight seal when the piston 710 is rotated to close off one or more of the inlet and the outlet conduits 714, 715, 716 without using any external sealing components or deformable seals.

While only a top cross sectional view of the actuation mechanism 700 is shown, it should be understood that the actuation mechanism includes an appropriate depth to accommodate the inlet and outlet conduits 714, 716, to accommodate the attachment of the piston 710 to a motor for effectuating rotational movement, and to accommodate connecting the outlet 720 of the piston 710 to the rest of a downstream liquid chromatography system.

The actuation mechanism 700 may be configured to open and close the respective first and second inlet conduits 714, 715 via rotation of the piston 710 about the bored structure 712. The position in FIG. 10 shows the actuation mechanism 700 in a state where the first inlet conduit 714 is in an open state whereby fluid can flow through the inlet 714 into the open space 718 created by the keyed flat surface 720 of the piston 710. Clockwise or counterclockwise rotation from this open position would close the first inlet conduit 714. Similarly, rotating the piston 710 clockwise further so that the keyed flat surface 720 extends between the second inlet conduit 715 and the outlet conduit 716 would open the second inlet conduit 715 and close the first inlet conduit 714.

The actuation mechanism 700 may deploy either of these rotations in order to effectuate opening and closing of the first and second inlet conduits 714, 715. Moreover, the angles θ are shown, between each of the first inlet conduit 714 and the outlet conduit 716, and between the second inlet conduit 715 and the outlet conduit 716. These angles θ define the rotational distance between the respective conduits 714, 715, 716. It may be desirable to include a relatively small angle θ that is less, for example, than 90 degrees, in order to reduce the size of the open space 718 in the system. Reducing the size of this open space 718 and quickly opening and closing the inlets via a small angle θ may help to reduce or eliminate pressure pulses created by the actuation mechanism 700.

Figure 12:
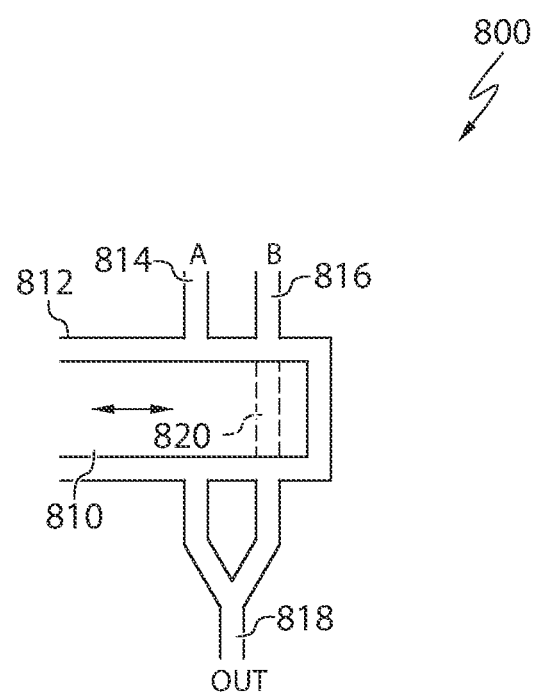
FIG. 12 depicts a schematic cross-sectional view of an actuation mechanism for a switching valve, in accordance with one embodiment.

FIG. 12 depicts a schematic cross-sectional view of another actuation mechanism 800 for a switching valve, in accordance with one embodiment. The actuation mechanism 800 includes a piston 810 located within a bored structure 812. A first inlet conduit 814 and a second inlet conduit 816 provide fluid from the bored structure 812 to the piston 810. A combined outlet conduit 818 allows fluid to leave the actuation mechanism 800. The piston 810 includes a conduit 820 that extends therethrough to connect the second inlet conduits 816 with the outlet conduit 818 when the piston 810 is in the relative position to the bored structure 812 that is shown. The piston 810 can move axially leftward to connect the first inlet conduit 814 to the outlet conduit 818. Alternatively, the piston can move axially rightward to close off each of the first and second inlet conduits 814, 816.

Like the previous embodiments, clearances of less than 6 microns are contemplated between the piston 810 and the bored structure 812 in order to retain a fluid tight seal when the piston 810 is moved to open or close off the inlet and outlet conduits 814, 816 without using any external sealing components or deformable seals. Again, unlike the embodiment shown in FIG. 11, movement of the piston 810 relative to the bored structure 512 is axial rather than rotational to open and close the two inlet conduits 814, 816 with the actuation mechanism 800.

Figure 13:
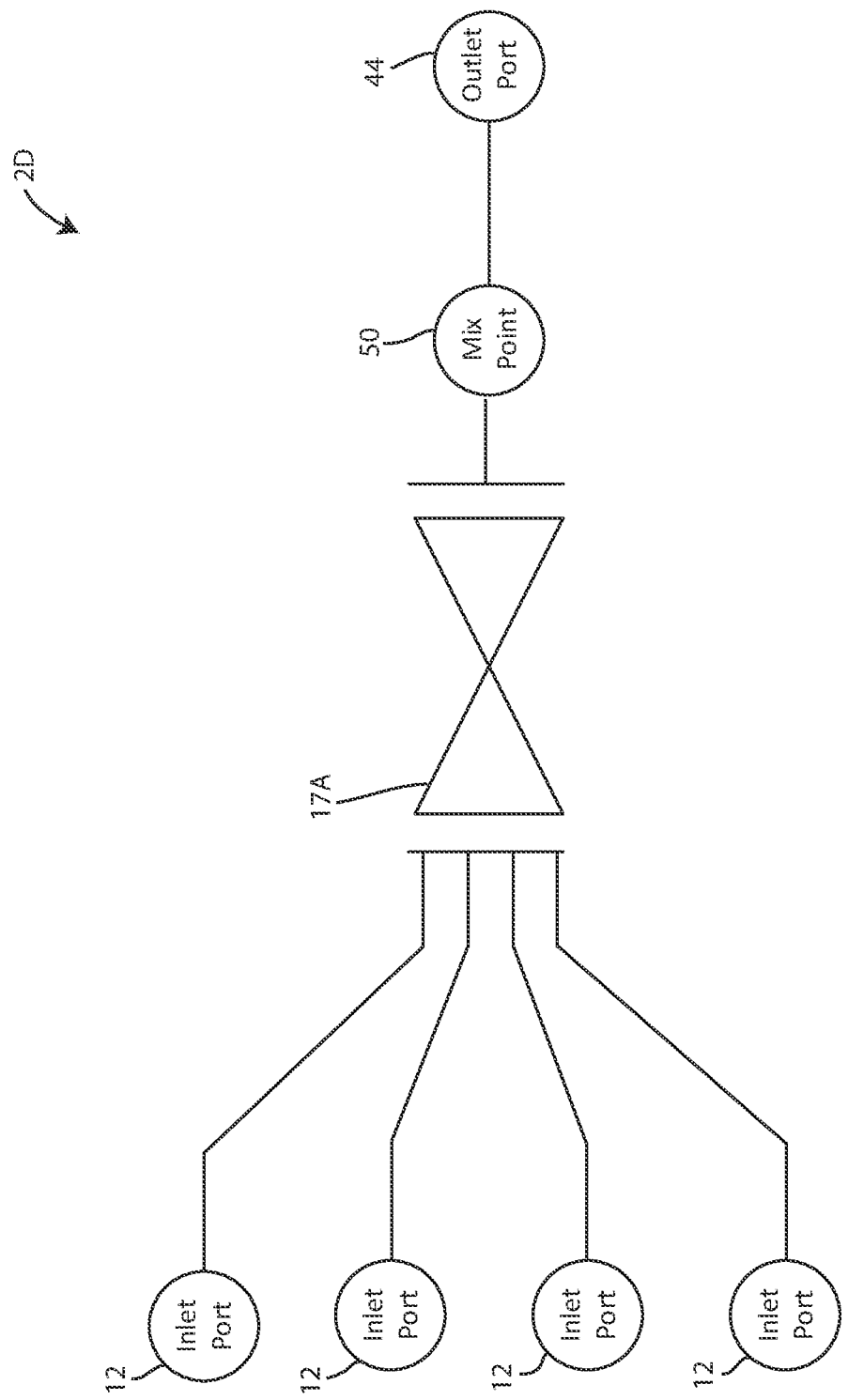
FIG. 13 depicts a schematic view of another gradient proportioning valve, in accordance with one embodiment.

FIG. 13 depicts a schematic view of another gradient proportioning valve 2D, in accordance with one embodiment. The gradient proportioning valve 2D is shown schematically including four separate inlet ports 12 which provide fluid via a conduit or channel to a single switching valve 17A. As shown, the switching valve 17A is configured to receive fluid from each of the four separate inlet ports 12 and provide a single outlet from the switching valves 17A. Downstream from the single switching valve may be a downstream mix point 50 which may be a greater volume region that helps mix fluid after the switching valve 17A but prior to the outlet. Rather than being a separate volumetric chamber, the mix point 50 may be incorporated in the actuation mechanism of the switching valve 17A. Downstream from the mix point 50 is an outlet 44.

FIG. 13 shows one example schematic view of the gradient proportioning valve 2D where all four inlet channels are connected to the single switching valve 17A. Further, the schematic shows no accumulator chambers 16. In other embodiments contemplated, accumulator chambers may exist for each inlet port 12 prior to providing the fluid to the switching valve 17A. The schematic having four inlet channels for each valve can be used to describe embodiments consistent with the actuation mechanisms shown in FIG. 14 described hereinbelow.

Figure 14:
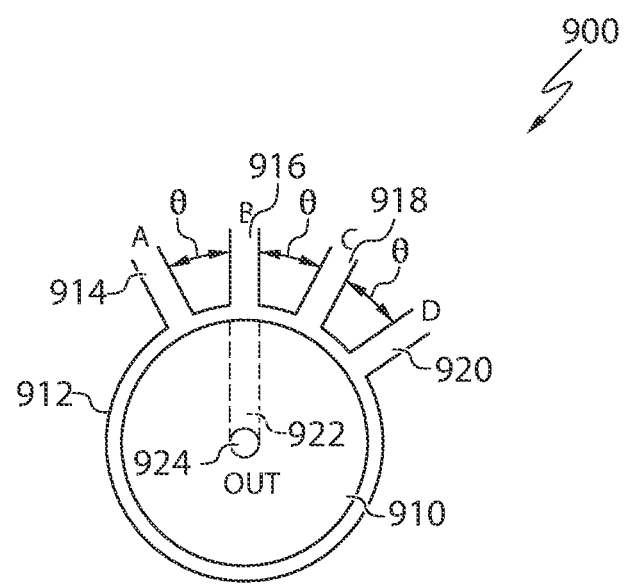
FIG. 14 depicts a schematic cross-sectional view of an actuation mechanism for a switching valve, in accordance with one embodiment.

FIG. 14 depicts a schematic cross-sectional view of another actuation mechanism 900 for a switching valve, in accordance with one embodiment. The actuation mechanism 900 includes a piston 910 located within a bored structure 912. A first inlet conduit 914, a second inlet conduit 916, a third inlet conduit 918, and a fourth inlet conduit 920 each provide fluid to the actuation mechanism 900 from different fluid sources. The piston 910 includes a conduit 922 that extends from exterior of the piston 910 into the middle of the piston 910. An outlet conduit 924 is drilled axially through the piston 910 to allow fluid to flow out of the actuation mechanism 900. Like the previous embodiments, clearances of less than 6 microns are contemplated between the piston 910 and the bored structure 912 in order to retain a fluid tight seal when the piston 910 is rotated to close off the inlet and outlet conduits 914, 916, 918, 920 without using any external sealing components or deformable seals.

While only a top cross sectional view of the actuation mechanism 900 is shown, it should be understood that the actuation mechanism includes an appropriate depth to accommodate the inlet and outlet conduits 914, 916, 918, 920 to accommodate the attachment of the piston 910 to a motor for effectuating rotational movement, and to accommodate connecting the outlet 924 of the piston 910 to the rest of a downstream liquid chromatography system.

The actuation mechanism 900 may be configured to open and close the respective first, second, third and fourth inlet conduits 914, 916, 918, 920 via rotation of the piston 910 about the bored structure 912. The position in FIG. 14 shows the actuation mechanism 900 in a state where the second inlet conduit 916 is in an open state whereby fluid can flow from the second inlet conduit 916 through the conduit 922 of the piston 910 and out of the axially drilled outlet conduit 924 of the piston 910. The actuation mechanism 900 may deploy either clockwise or counterclockwise rotation on the piston 910 relative to the bored structure 912 in order to effectuate opening and closing of the various inlet conduits 914, 916, 918, 920. For example, clockwise rotation may move the piston 910 from opening the second inlet conduit 916 to opening the third inlet conduit 918. Alternatively, from the position shown, a counterclockwise rotation may open the first inlet conduit 914. In the embodiment shown, the closed state may also occur when the piston 910 is rotated so that the outlet of the conduit 922 is facing the wall of the bored structure 612 that is located either between one of the inlet conduits 914, 916, 918, 920 or counterclockwise to the first inlet conduit 914 or clockwise to the fourth inlet conduit 920. The present embodiment contemplates the actuation mechanism 600 being able to toggle between the four inlet conduits 914, 916, 918, 920, with one inlet open at a given time, and whereby the actuation mechanism always includes the same outlet 924.

Moreover, the angle θ between each of the inlet conduits 914, 916, 918, 920 defines the rotational distance between the various inlet conduits 914, 916, 918, 920. It may be desirable to include a relatively small angle θ that is less, for example, than 90 degrees, in order to allow for the actuation mechanism 900 to toggle between positions more quickly. This may help to reduce or eliminate pressure pulses created by the actuation mechanism 900.

While the embodiments above have been described using either axial or rotational movement, other embodiments contemplated for actuation mechanisms could use the combination of both axial and rotational movement. For example, it may be contemplated that the inlets could actually be positioned axially spaced apart as well as rotationally spaced apart. For example, in the embodiment shown in FIG. 14, rather than having all four inlets come to the piston 910 at the same depth, two inlets (for example, inlets 916, 920) may be spaced apart axially relative to the other two inlets (for example, inlets 914, 918). Using both axial and rotational spacing may allow for the total space between the various inlets to be reduced. For example, if the inlets 914, 916, 918, 920 are located at corners of a diamond or square shape, movement of the piston from any one inlet to another would be close to the same. In contrast, the embodiment where the inlets 914, 916, 918, 920 come to the piston 910 at a single plane each separated by the angle θ, the movement between the inlet 914 and the inlet 920 is much greater than the movement between the inlet 916 and the inlet 918. Various embodiments of the above described actuation mechanisms having more than one inlet may employ both rotational and axial movement in combination to reduce the space between the various inlets.

Still further, while the embodiments described hereinabove show four inlet ports for each gradient proportioning valve 2D, the actuation mechanism described herein may be incorporated into gradient proportioning valves having any number of inlets for any number of solvent lines. Further, while the embodiments of actuation mechanisms show single inlets, two inlets, or four inlets, the principles of the actuation mechanisms described hereinabove may be applied to other number of inlets, such as three inlets, or more than 4 inlets. Whatever the embodiment, the actuation mechanisms contemplated herein may include a single outlet, no matter how many inlets the actuation mechanisms are configured for.

Methods of operating switching valves for a gradient proportioning valve of a liquid chromatography system are further contemplated. For example, methods contemplated herein include providing a gradient proportioning valve, such as one of the valves 17A, 17B, 17C, 17D described herein, including a manifold having a plurality of conduits. Methods include receiving a plurality of fluids in a plurality of inlet ports of the gradient proportioning valve, opening and closing each of a plurality of conduits in a controlled manner with an actuation mechanism, such as one of the actuation mechanism 200, 300, 400, 500, 600, 700, 800, 900, having a piston, such as one of the pistons 210, 310, 410, 510, 610, 710, 810, 910 located within a bored structure, such as one of the bored structures 212, 312, 412, 512, 612, 712, 812, 912, surrounding the piston. Methods include maintaining a fluid tight seal between the piston and the bored structure during the opening and closing, wherein the piston and the bored structure have a tight tolerance configured to create the fluid tight seal. Methods include mixing the plurality of fluids in a controlled manner within the manifold of the gradient proportioning valve, and outputting the fluid composition from a common outlet port of the gradient proportioning valve.

Still further methods include preventing unwanted fluidic pressure pulses in the manifold with the actuation mechanism through the minimization of internal fluid volumes within the piston and the bored structure. Moreover, methods contemplated include opening, with the actuation mechanism, two or more of the plurality of conduits such as with the embodiments shown in FIGS. 9-14.

Methods further include rotating the piston about the bored structure to open and close the at least one of the plurality of conduits in the controlled manner, such as in the embodiments shown in FIGS. 5-7, 10, 11 and 14. Alternatively, methods include moving the piston axially within the bored structure to open and close the at least one of the plurality of conduits in the controlled manner, such as in the embodiments shown in FIGS. 8 and 12. Additionally, methods may include moving the piston both axially and with rotation relative to the bored structure as described hereinabove.

While the invention has been shown and described with reference to specific embodiments, it should be understood by those skilled in the art that various changes in form and detail may be made therein without departing from the spirit and scope of the invention as recited in the accompanying claims.

What is claimed is:

1. A gradient proportioning valve (GPV) for liquid chromatography comprising:
   a plurality of inlet ports configured to receive a plurality of solvents;
   a manifold connected to each of the plurality of inlet ports configured to mix the plurality of solvent in a controlled manner to provide a solvent composition, the manifold including a plurality of conduits internal to the manifold, each of the plurality of conduits receiving solvent through a respective one of the plurality of inlet ports;
   an actuation mechanism having a piston located within a bored structure surrounding the piston, the actuation mechanism configured to open and close at least one of the plurality of conduits in a controlled manner wherein the piston and the bored structure have a tight tolerance configured to create a fluid tight seal when the actuation mechanism closes the at least one of the plurality of conduits, wherein the tight tolerance creates a clearance of less than 6 microns between the piston and the bored structure; and
   a common outlet port configured to receive the solvent composition,
   wherein the GPV is configured for setting a desired precision solvent composition in liquid chromatography systems, to provide a continuous stream of a compositionally accurate mixture of solvents, wherein the GPV includes no integral accumulator chambers,
   wherein the piston is configured to rotate about the bored structure to open and close the at least one of the plurality of conduits in the controlled manner.

2. The gradient proportioning valve of claim 1, wherein the piston and the bored structure create the fluid tight seal without a deformable sealing element.

3. The gradient proportioning valve of claim 1, wherein the actuation mechanism includes a solenoid valve.

4. The gradient proportioning valve of claim 1, wherein the piston is made of ceramic.

5. The gradient proportioning valve of claim 1, wherein the actuation mechanism is configured to open and close two or more of the plurality of conduits.

6. The gradient proportioning valve of claim 1, wherein the piston is configured to rotate less than 90 degrees to open and close the at least one of the plurality of conduits in the controlled manner.

7. The gradient proportioning valve of claim 1, wherein the GPV is configured for mixing the plurality of solvents upstream from a pump in a liquid chromatography system.

8. The gradient proportioning valve of claim 1, wherein the actuation mechanism includes a plurality of inlet conduits each in operable communication with one of the plurality of conduits of the manifold, the actuation mechanism including a common outlet conduit.

9. The gradient proportioning valve of claim 1, configured for use in low pressure mixing.

10. A liquid chromatography system comprising:
    the gradient proportioning valve (GPV) of claim 1;
    a pump located downstream from the GPV;
    an injector;
    a separation column; and
    a detector.

11. A method of mixing solvents comprising:
    providing a gradient proportioning valve (GPV) including a manifold having a plurality of conduits, wherein the GPV includes no integral accumulator chambers;
    setting a desired precision solvent composition for mixing solvents in liquid chromatography systems;
    receiving a plurality of solvents in a plurality of inlet ports of the GPV;
    opening and closing each of a plurality of conduits in a controlled manner with an actuation mechanism having a piston located within a bored structure surrounding the piston;

maintaining a fluid tight seal between the piston and the bored structure during the opening and closing, wherein the piston and the bored structure have a tight tolerance configured to create the fluid tight seal, wherein the tight tolerance creates a clearance of less than 6 microns between the piston and the bored structure;

mixing the plurality of solvents in a controlled manner within the manifold of the GPV;

outputting the solvent composition from a common outlet port of the GPV;

providing a continuous stream of a compositionally accurate mixture of solvents according to the desired precision solvent composition; and rotating the piston about the bored structure to open and close the at least one of the plurality of conduits in the controlled manner.

12. The method of claim 11, further comprising:
preventing unwanted fluidic pressure pulses in the manifold with the actuation mechanism through a minimization of internal fluid volumes within the piston and the bored structure.

13. The method of claim 11, wherein the actuation mechanism is made of ceramic.

14. The method of claim 11, further comprising opening, with the actuation mechanism, two or more of the plurality of conduits.

15. The method of claim 11, wherein the mixing the plurality of solvents in the controlled manner within the manifold of the GPV occurs at low pressure.

16. The method of claim 11, further comprising mixing the plurality of solvents in the controlled manner within the manifold of the GPV upstream from a pump.

* * * * *